May 10, 1949.     E. E. FRAZIER     2,469,959

PISTON RING

Filed Dec. 12, 1945

Elihu E. Frazier,
Inventor.
Haynes and Koenig,
Attorneys.

Patented May 10, 1949

2,469,959

UNITED STATES PATENT OFFICE 2,469,959

PISTON RING

Elihu E. Frazier, St. Louis, Mo., assignor to The Gill-Owen Company, Litchfield, Ill., a corporation of Illinois Application December 12, 1945, Serial No. 634,440

5 Claims. (Cl. 309—45)

This invention relates to piston rings, and with regard to certain more specific features, to multi-piece rings.

Among the several objects of the invention may be noted the provision of a simple, lightweight ring which incorporates positive lap means for preventing leakage; the provision of a ring of the class described which may be accommodated to various piston groove widths; and the provision of a ring of the class described which may be very economically manufactured. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a side elevation of a piston embodying one form of the invention, fragmentary cylinder sections being shown;

Similar reference characters indicate corresponding parts throughout the several views of the drawings.

Figure 1:
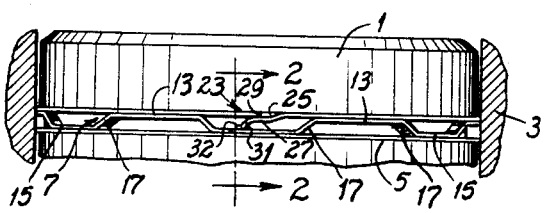

Referring more particularly to Fig. 1, there is shown at numeral 1 a piston in the usual cylinder 3. In the piston 1 is a ring groove 5 which is representative of several of such grooves which may be carried by the piston.

The new multi-part construction consists of an intermediate spacing ring 7 which is made circular from a ribbon of spring steel. The ribbon is of the order of 1/64 in. thick and of the order of 1/8 in. wide. The ends 9 of this ring lie in the same plane. They allow a gap 11.

The ring 7 is stamped into a wave form to provide alternate flat pads 13 and 15 in axially spaced planes. The pads 13 and 15 are joined by sloping parts 17. The arrangement is such that for a ring of about 3½ in. diameter the sloping portions are approximately 1/16 in. long, located at about 45° to the pads 13 and 15. The latter each covers about 3/4 in. of arc. The groups of pads 13 and 15 lie in respective planes spaced apart about 1/8 in.

Next to the wavy ring 7 are oppositely disposed sealing rings 19 and 21, also made of thin steel ribbon as in the case of ring 7. Each ring 19 and 21 is flat around most of its periphery except at a lap joint 23. At this lap joint each ring has an offset 25 of an amount equal to about the thickness of the ribbon, that is to say, about 1/64 inch. Beyond the offset 25 is a flat extension 27 which forms a sliding support for the opposite end 29 of the ring. Extending from the flat support 27 is an angled part 31 forming a lug. This lug 31 is of a length such that when the ring 19, for example, is placed against the crests of the flat portions or waves 13 of ring 7, said lug 31 will contact one of the bottom surfaces or troughs of said waves 15. The actual contact is preferably, though not necessarily, made at a small flat pad 32 of limited peripheral extent, as compared to the angular extent of the containing trough. The lug 31 has a slightly turned end 32 to provide a satisfactory seat and to make accurate die manufacture easier. End 32 definitely controls the distance between 29 and 15 (Fig. 4).

Figure 5:
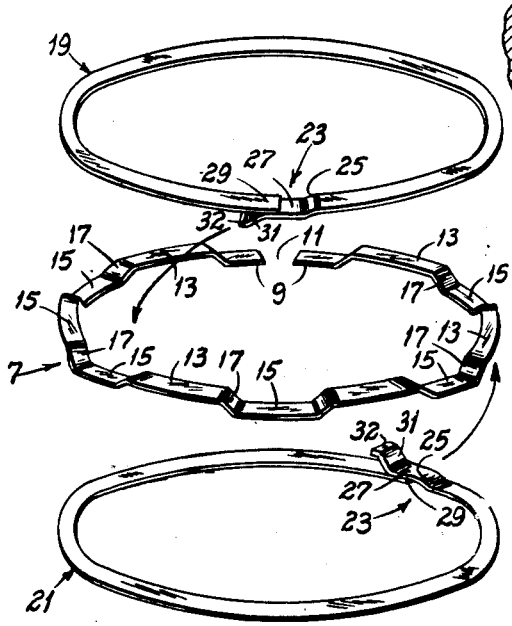
Fig. 5 is an exploded view of one form of the ring.

Rings 19 and 21 are identical but upon assembly one is reversed with respect to the other with the wavy ring 7 sandwiched therebetween. Then the lap joint 23 of, for example, ring 21 is (as indicated by the curved arrow in Fig. 5) placed within one of the waves 13, at approximately 120° from the gap 11. Also, as indicated by the upper curved arrow in Fig. 5, the lap joint 23 of the ring 19 is placed within one of the waves 15 approximately 120° in the opposite direction from the gap 11. Thus the gap 11 and the joints 23 of rings 19 and 21 are at approximately 120° intervals.

Figure 2:
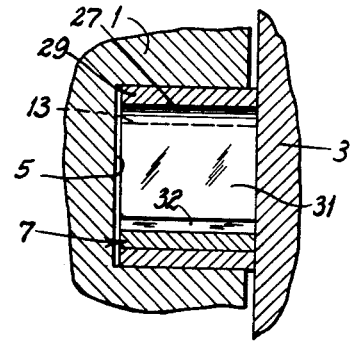
Fig. 2 is an enlarged detail section taken on line 2—2 of Fig. 1.
Figure 3:
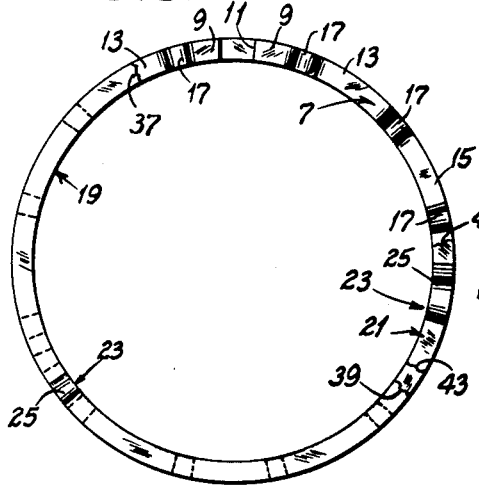
Fig. 3 is a plan view of a ring assembly, parts being broken away for purposes of illustration.
Figure 4:
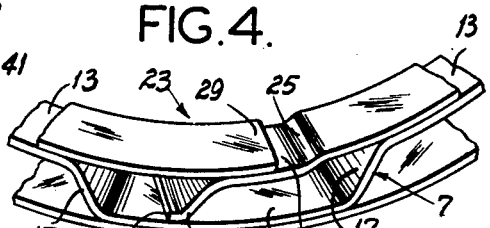
Fig. 4 is an enlarged fragmentary perspective view showing a lapped joint.

The state of affairs is then as indicated in Figs. 2–4, the rings being inserted into the groove 5 in the angular relationships specified. The normal diameters of the rings before the piston is placed in the cylinder 3 is slightly larger than the cylinder. Hence when the piston with the rings therein is inserted into the cylinder, the ring diameters become smaller, thereby tensioning the rings against the cylinder surface. For the purpose, the ends 29 may slide over the offset supporting pads 27. Also, either ring 19 or 21 has some angular drifting movement with respect to the wavy ring 7 because of the range of movements of the supports 31 in the containing space in ring 7. Since all portions of either of the rings 19 or 21, with the exception of the portions 25, 27 and 31, are in a flat plane, it will be seen that the width of the accommodating piston groove 5 will be the sum of the widths of thicknesses of the rings 19 and 21 and the thickness of the wavy ring 7 measured between the outside faces of the offsets 13 and 15. The latter being about ⅛ in. and the thicknesses of rings 19 and 21 each about 1/64 in., the groove width for three rings will be slightly over 3/16 inch.

All of the rings are made of a suitable ribbon spring steel such as Swedish steel.

Figure 6:
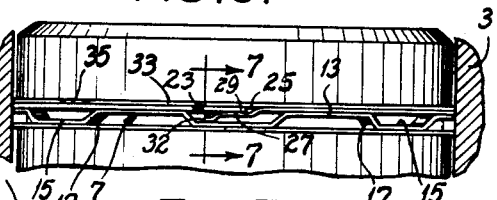
Fig. 6 is a view similar to Fig. 1 showing another embodiment.
Figure 7:
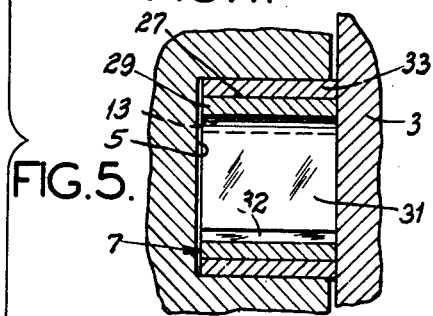
Fig. 7 is a view like Fig. 2 but taken on line 7—7 of Fig. 6.

If it is desired to accommodate the invention to wider piston grooves, the wave forms 13 and 15 in the ring 7 may be made deeper and the lugs 31 of rings 19 and 21 may be made correspondingly longer. Or, an additional flat filler ring may be used as indicated in Figs. 6 and 7. In this case the three rings 7, 19 and 21 are assembled in the groove 5 as before, but in order to take up the additional space, a plain flat spring ring 33 is additionally used. This ring is like rings 19 and 21 but instead of the lap joint 23, it has the usual flat gap, as indicated at 35. Otherwise it has no distinguishing characteristics and further description will be unnecessary. It will also be seen that if a still wider groove is to be filled, additional rings such as the flat ring 33 may be used. One of these may be located on the opposite side of the assembly 7, 19, 21, or if desired, both may be on the same side with ring 33.

In considering Fig. 3 it should be noted that the upper ring 19 is broken away at 37 and 39. The break at 37 exposes the intermediate ring 7, including its gap 11. The intermediate ring 7 is broken away at 41 to expose the lap portions 23 of the bottom ring 21. The second exposing break for the ring 7 is shown at 43.

It will be understood that if desired the ring 7 may be made with fewer wave offsets 13 and 15 than shown. For example, a single offset of the type shown at 15 might be employed for the lap joint 23 of ring 19 and a single offset such as 13 might be employed for the lap 23 of ring 21.

It is also to be understood that in some cases it may be possible to use one ring such as 7 and only one other ring such as 19 or 21 with or without an additional plain flat ring.

Advantages of the invention are that an adjustable leak-proof lap joint is formed at the slidable parts 27 and 29. These parts are not allowed simply to overhang above an offset, such as for example, 15 in Fig. 4. Instead, they are supported by means of the lugs 31 which rest slidably upon, for example, surface 15. At the same time, some angular drift is allowed between rings 7, 19 and 21 which permits the assembly to accommodate itself to the conditions in a particular cylinder without scoring. Of course the entire assembly may drift angularly in the groove 5.

The ring is quite economical to manufacture since the forming of the steel ribbons into rings of the shape shown is quite readily carried out.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A multi-piece piston ring assembly comprising a ring of axially waved shape composed of crests and troughs and having a gap, a second ring lying adjacent the first ring and engaging the crests of said waved shape, said second ring having two adjacent ends, an offset portion near one of said ends and lapping the other end, and an angled extension from said offset portion engaging a trough in the waved shape.

2. A multi-piece piston ring assembly comprising a first spring ring having a gap between its ends and elsewhere having an axial recess of substantial arcuate extent, and a second spring ring having two ends, said second ring having an offset near one end providing a lapping portion next to its other end, said offset having an angled extension and a flat pad of limited extent engaging the bottom of said axial recess, to provide for support of the lapping portion and for movement of the offset in the recess.

3. A multi-piece piston ring assembly comprising a first spring ring having a gap between its ends and elsewhere having an axially directed recess of substantial arcuate extent, and a second spring ring having two ends, said second ring having an offset near one end providing a lapping portion next to its other end, said offset having an angled extension engaging the bottom of said axial recess and being substantially angularly movable therein.

4. A multi-piece piston ring assembly comprising a first string having a gap between its ends and composed of a steel ribbon, an axially directed offset in said ribbon, a second and essentially flat ring composed of a steel ribbon having two ends, an offset adjacent one end providing a lapping support for the other end, and an angled extension from said lapping support, said extension being located in the offset of the first-mentioned ring and engaging the base of said offset.

5. A multi-piece piston spring ring comprising a first ring having a gap between its ends and composed of a steel ribbon, an axially directed flat offset in said ribbon, a second and essentially flat ring composed of a steel ribbon having two ends, an offset adjacent one end providing a lapping support for the other end, and an angled extension from said lapping support, said extension being located in the flat offset of the first-mentioned ring and engaging the base of said offset, said last-named flat offset being of a length permitting substantial angular movement therein of the angled extension.

ELIHU E. FRAZIER.

REFERENCES CITED

The following references are of record in the file of this patent:

UNITED STATES PATENTS

| Number | Name | Date |
|---|---|---|
| 2,281,873 | Engelhardt | May 5, 1942 |
| 2,325,196 | Rothweiler | July 27, 1943 |
| 2,357,467 | Guelker | Sept. 5, 1944 |